(12) United States Patent
Murayama

(10) Patent No.: US 10,170,835 B2
(45) Date of Patent: Jan. 1, 2019

(54) WIRELESS COMMUNICATION DEVICE

(71) Applicant: Murata Manufacturing Co., Ltd., Nagaokakyo-shi, Kyoto-fu (JP)

(72) Inventor: Hiromi Murayama, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 236 days.

(21) Appl. No.: 14/813,236

(22) Filed: Jul. 30, 2015

(65) Prior Publication Data

US 2015/0333406 A1    Nov. 19, 2015

Related U.S. Application Data

(63) Continuation of application No. PCT/JP2015/052145, filed on Jan. 27, 2015.

(30) Foreign Application Priority Data

Jan. 30, 2014    (JP) .................................. 2014-015478
Jun. 13, 2014    (JP) .................................. 2014-122273

(51) Int. Cl.
    *H01Q 7/00*    (2006.01)
    *H01Q 1/22*    (2006.01)
    (Continued)

(52) U.S. Cl.
    CPC ................. *H01Q 7/00* (2013.01); *H01Q 1/24* (2013.01); *H04B 5/0062* (2013.01);
    (Continued)

(58) Field of Classification Search
    CPC ............ H01Q 7/00; H01Q 1/24; H01Q 1/243; H01Q 1/2266; H04B 5/0062; H04B 5/0081
    See application file for complete search history.

(56) References Cited

U.S. PATENT DOCUMENTS 5,568,162 A * 10/1996 Samsel .................. H01Q 1/526
                                                        343/726
6,215,455 B1 * 4/2001 Lamata D'Angelo ... H01Q 1/22
                                                        343/741
(Continued)

FOREIGN PATENT DOCUMENTS

JP        2002-064320 A    2/2002
JP        2005-033413 A    2/2005
(Continued)

OTHER PUBLICATIONS

Official Communication issued in International Patent Application No. PCT/JP2015/052145, dated Mar. 31, 2015.

*Primary Examiner* — Jessica Han
*Assistant Examiner* — Michael Bouizza
(74) *Attorney, Agent, or Firm* — Keating & Bennett, LLP

(57) ABSTRACT

A wireless communication device includes a lower metal housing as a planar conductor including an opening and a planar coil antenna arranged so as to oppose the opening and including a coil pattern and a coil opening. A linear strip pattern which includes a plurality of linear strip portions parallel or substantially parallel with one another and a portion of which is connected to the lower metal housing around the opening is provided in the opening to achieve sufficient communication characteristics and prevent an increase in an opening area of the opening.

21 Claims, 12 Drawing Sheets

(51) Int. Cl.
*H01Q 1/24* (2006.01)
*H04B 5/00* (2006.01)

(52) U.S. Cl.
CPC ......... *H04B 5/0081* (2013.01); *H01Q 1/2266* (2013.01); *H01Q 1/243* (2013.01)

(56) References Cited

U.S. PATENT DOCUMENTS

| | | | |
|---|---|---|---|
| 2005/0006473 A1 | 1/2005 | Deguchi et al. | |
| 2005/0178835 A1* | 8/2005 | Akiho | G06K 7/0008 235/451 |
| 2012/0091821 A1* | 4/2012 | Kato | H01Q 1/38 307/104 |
| 2012/0262357 A1 | 10/2012 | Kato et al. | |
| 2014/0218261 A1 | 8/2014 | Ito | |

FOREIGN PATENT DOCUMENTS

| | | |
|---|---|---|
| WO | 2010/122888 A1 | 10/2010 |
| WO | 2013/069465 A1 | 5/2013 |

* cited by examiner

WIRELESS COMMUNICATION DEVICE

BACKGROUND OF THE INVENTION

1. Field of the Invention

The present invention relates to a wireless communication device preferably for use in a radio-frequency identification (RFID) system and a short-range wireless communication system.

2. Description of the Related Art

A planar coil antenna is generally used in a high frequency (HF)-band RFID system that uses near field communication (NFC), and is mounted on a mobile terminal such as a cellular phone terminal or a mobile information terminal.

On the other hand, a reduction in thickness of the wireless communication device such as the cellular phone terminal has been accelerated recently and the case where a metal housing is used (including the case where metal plating processing is performed on a resin housing) has been increased in order to cope with insufficient strength due to the reduction in thickness or attempts to improve design properties.

When metal is used for the housing, however, the planar coil antenna that is incorporated in the terminal opposes a metal surface and an induction current (eddy current) cancelling a signal current of the planar coil therefore flows through the metal surface. Due to this, the planar coil antenna is shielded by the metal surface and cannot communicate with a device of another party.

On the other hand, for example, International Publication No. 2013/069465 discloses an antenna device in which a planar coil antenna is arranged so as to be close to a metal member. The antenna device in International Publication No. 2013/069465 enables an NFC antenna to be used even in the device in which the planar coil antenna is arranged so as to be close to the metal member by providing an opening on the metal member causing at least a part of the planar coil antenna to be exposed.

In the antenna device as disclosed in International Publication No. 2013/069465, the opening is formed on the metal member so as to have an opening area that is substantially the same as that of a coil pattern of the planar coil antenna. Therefore, when the metal member is used for the housing, the mechanical strength of the housing itself lowers. In particular, in a device having a large area and being reduced in thickness, such as a mobile terminal or a tablet PC, lowering of the mechanical strength of the metal housing needs to be avoided. Further, when the opening is exposed to the outer surface, the design of the outer appearance is largely constrained. Further, when the above-mentioned metal member is used as an electrostatic shield member, an electrostatic shield effect lowers in the opening and there arises a problem in electric characteristics.

SUMMARY OF THE INVENTION

Preferred embodiments of the present invention provide a wireless communication device in which a planar conductor including an opening and a planar coil antenna are arranged in an opposing manner, which is capable of obtaining sufficient communication characteristics while preventing an increase in an opening area of the opening.

A wireless communication device according to an aspect of various preferred embodiments of the present invention includes a planar conductor including an opening and a planar coil antenna arranged so as to oppose the opening and including a coil pattern and a coil opening, wherein a linear strip pattern which includes a plurality of linear strip portions parallel or substantially parallel with one another and a portion of which is connected to the planar conductor around the opening is provided in the opening.

It is preferable that a dimension of the linear strip portions in an extension direction in a dimension of the opening be larger than an outer dimension of the coil pattern in the same direction when seen from above.

It is preferable that when seen from above, a dimension of the linear strip portions in an extension direction in a dimension of the opening be larger than a dimension of the linear strip portions in a direction perpendicular or substantially perpendicular to the extension direction and a dimension of the opening is larger than a dimension of the coil opening in the direction perpendicular or substantially perpendicular to the extension direction of the linear strip portions.

It is preferable that the opening have a rectangular or substantially rectangular shape when seen from above and the linear strip pattern is connected to opposing two sides of the opening.

It is preferable that a coverage of the opening by the linear strip pattern be equal to or higher than about 30%, for example.

It is preferable that an inductance value of the planar coil antenna be defined such that a resonant frequency of the planar coil antenna has a predetermined value in accordance with inductance of the linear strip pattern coupled to the planar coil antenna.

It is preferable that a winding width of the coil pattern of the planar coil antenna be larger than a total value of a line width for two linear strip portions and a line-to-line distance of the linear strip portions.

According to various preferred embodiments of the present invention, the linear strip pattern which includes the plurality of linear strip portions parallel or substantially parallel with one another is provided in the opening of the planar conductor. Therefore, a portion of the opening is closed and an opening area is small. In addition, a current is induced to the vicinity of the opening and the plurality of linear strip portions in a state where the planar coil antenna opposes the opening. With this, a magnetic field passes through the planar conductor in a penetrating manner and sufficient communication characteristics are obtained. Therefore, when the planar conductor is used as a structural member, mechanical strength thereof is ensured. Further, when the planar conductor is used as a shield member, a shield effect thereof is ensured. Moreover, when the planar conductor is used for the outer surface of the device, constraints on the design of the outer appearance are avoided or reduced.

In particular, the dimension of the linear strip portions in the extension direction in the dimension of the opening is larger than the outer dimension of the coil pattern in the same direction when seen from above. With this, a current in a direction of cancelling the magnetic field by the planar coil antenna is suppressed effectively.

When seen from above, the dimension of the linear strip portions in the extension direction in the dimension of the opening is larger than the dimension of the linear strip portions in the direction perpendicular or substantially perpendicular to the extension direction and the dimension of the opening is larger than the dimension of the coil opening in the direction perpendicular or substantially perpendicular to the extension direction of the linear strip portions. With this, the current in the direction of cancelling the magnetic field by the planar coil antenna is suppressed effectively.

Further, the opening preferably has a rectangular or substantially rectangular shape when seen from above and the linear strip pattern is connected to opposing two sides of the opening. With this, it is not easy for a current to flow around through the linear strip pattern, thus suppressing or preventing an induction current flowing through the linear strip pattern effectively.

The coverage of the opening by the linear strip pattern preferably is equal to or higher than about 30%, for example. This is preferable in view of mechanical strength, a shield effect, or constraint in design of outer appearance.

In addition, the inductance value of the planar coil antenna is defined such that the resonant frequency of the planar coil antenna has the predetermined value in accordance with inductance of the linear strip pattern coupled to the planar coil antenna. With this, the coil pattern of the planar coil antenna is increased in width using the inductance of the linear strip pattern effectively, so that a Q value and communication performance is improved.

Further, the winding width of the coil pattern of the planar coil antenna is larger than the total value of the line width for two linear strip portions of the linear strip portions and the line-to-line distance of the linear strip portions. With this, the induction current flowing through the linear strip pattern is suppressed sufficiently.

Thus, cancellation by the induction current is suppressed so as to increase the coupling degree to an antenna of another communication party and a communication distance is able to be increased. Alternatively, a predetermined communication distance is able to be ensured with a linear strip pattern having a small area.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
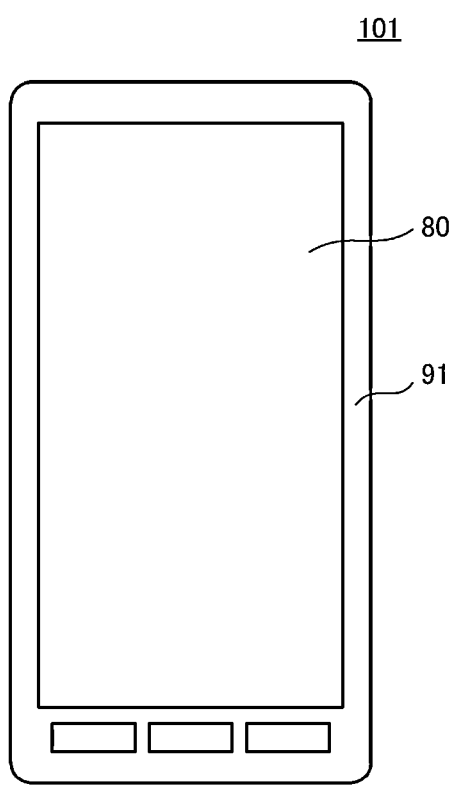
FIG. 1A is a front view of a mobile communication terminal 101 according to a first preferred embodiment of the present invention and FIG. 1B is a rear view thereof.

Hereinafter, preferred embodiments of the present invention will be described with reference to the accompanying drawings using several specific examples. The same reference numerals denote the same parts in the individual drawings. The respective preferred embodiments are non-limiting examples and partial replacement or combination of the configurations as described in different preferred embodiments can be made. In a second preferred embodiment and subsequent preferred embodiments, description of matters common to those in a first preferred embodiment is omitted and only different points are described. In particular, the same action effect with the same configuration is not referred in each preferred embodiment.

First Preferred Embodiment

Figure 1B:
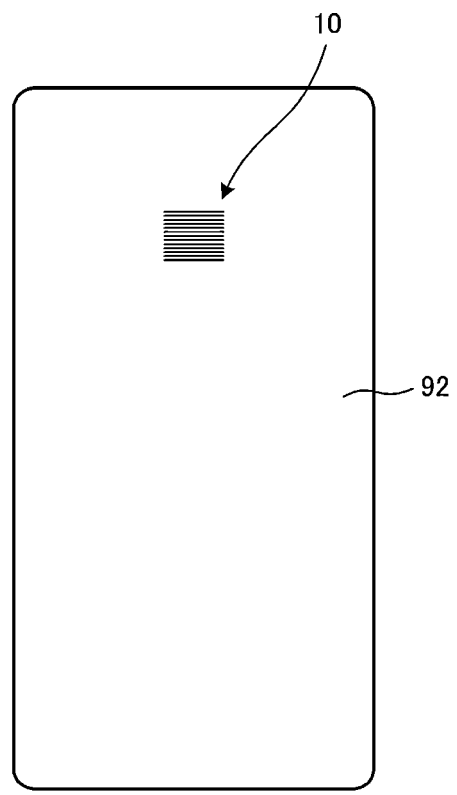
Figure 2:
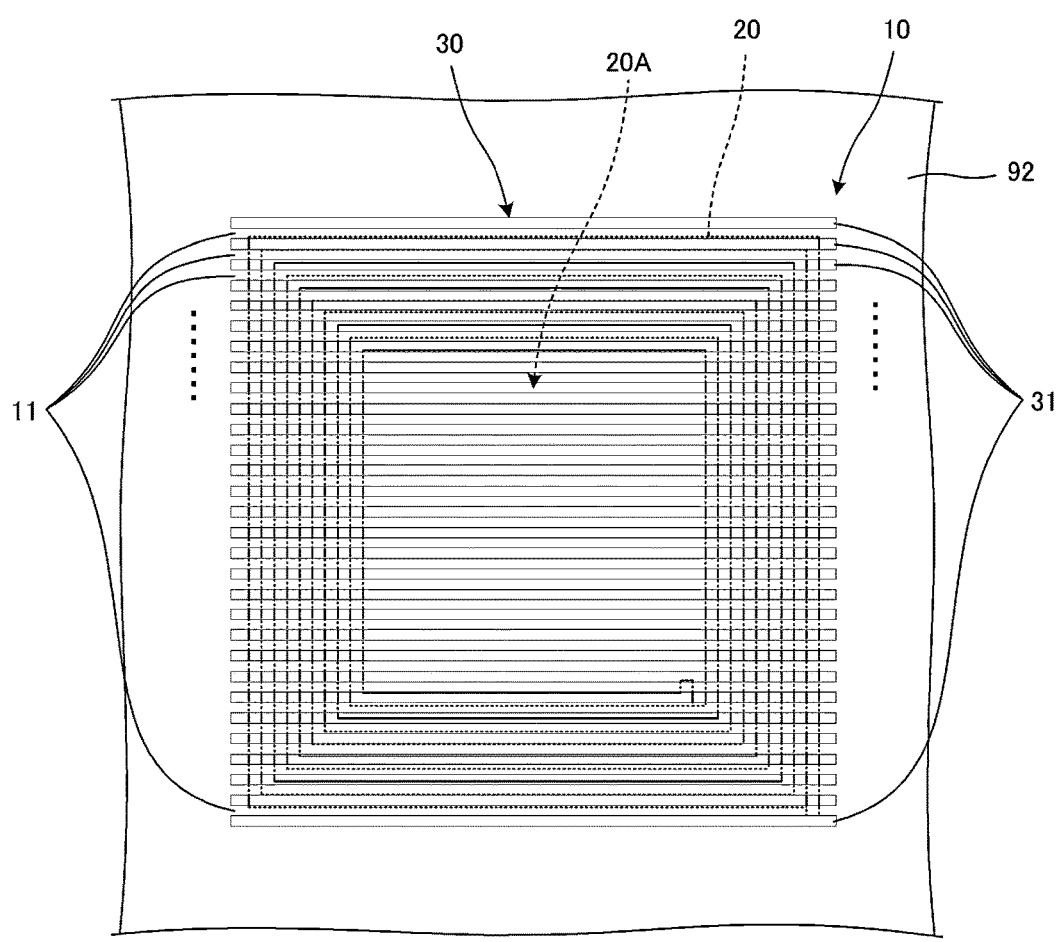
FIG. 2 is an enlarged plan view of an antenna portion of the mobile communication terminal according to the first preferred embodiment of the present invention.

FIG. 1A is a front view of a mobile communication terminal 101 according to the first preferred embodiment of the present invention and FIG. 1B is a rear view thereof. FIG. 2 is an enlarged plan view of an antenna portion of the mobile communication terminal 101. The mobile communication terminal 101 is an example of a "wireless communication device". The mobile communication terminal 101 includes an upper metal housing 91 and a lower metal housing 92 as main body structural members. The lower metal housing 92 is an example of a "planar conductor". The mobile communication terminal 101 includes a display/touch panel 80 on the front surface. A planar coil antenna is arranged at the inner side of the lower metal housing 92 so as to oppose the lower metal housing 92. An opening 30 is formed on the lower metal housing 92 at a position at which the planar coil antenna opposes it and a linear strip pattern 10 is provided in the opening 30. The linear strip pattern 10 and the above-mentioned planar coil antenna configure the antenna portion of the mobile communication terminal 101.

As used herein "planar conductor" indicates not only a conductor that is completely planar or flat, but also a conductor that is substantially planar or mostly flat (i.e., within manufacturing tolerances or including slight variations in flatness) as would have been understood by persons of skill in the art.

FIG. 2 is an enlarged plan view of the above-mentioned antenna portion. In the present preferred embodiment, the linear strip pattern 10 preferably has a stripe shape in the opening 30. The linear strip pattern 10 includes a plurality of linear strip portions 11 arranged to define the strip shape. The plurality of linear strip portions 11 are parallel or substantially parallel with one another and configure a portion of the lower metal housing 92. That is to say, both ends of the respective linear strip portions are connected to the inner circumference of the opening 30. Slits 31 are provided between the adjacent linear strip portions.

A coil pattern 20 is a rectangular or substantially rectangular spiral conductor pattern wound around a coil opening 20A and is provided on a flexible base material, for example. A magnetic layer is provided on the surfaces of the coil opening 20A and the coil pattern 20. It should be noted that the coil pattern is not limited to this shape. For example, the coil pattern may be a multilayer coil pattern formed by stacking a plurality of loop patterns or may be a coil pattern in which a magnetic layer is inserted into the coil opening. Further, the above-mentioned magnetic layer may be provided at only the rear surface side of the coil pattern 20 at the side opposite to the surface opposing the metal housing, or no magnetic layer may be provided.

A parallel or substantially parallel capacitor for a power supply circuit and for resonant frequency adjustment is connected to both ends of the coil pattern 20. It should be noted that the capacitor for resonant frequency adjustment may be connected in series to the coil pattern 20 or no capacitor for resonant frequency adjustment may be provided.

In FIG. 2, the outer dimension of the coil pattern 20 preferably is approximately 25 mm×25 mm and the inner dimension thereof preferably is approximately 13 mm×13 mm, for example. Line and space (L/S) of the coil pattern 20 preferably is 400 μm/200 μm and the number of turns thereof preferably is 10, for example. Capacitance of the above-mentioned parallel or substantially parallel capacitor is defined such that a resonant frequency preferably is 13.56 MHz in a state where the coil pattern 20 is incorporated in the housing of the mobile communication terminal (state where it opposes the lower metal housing 92), for example.

The dimension of the opening 30 preferably is approximately 27.1 mm×27.1 mm and the planar coil antenna opposes the opening 30, for example. The width of each of the linear strip portions 11 and the slits 31 preferably is approximately 0.5 mm, for example.

Figure 3C:
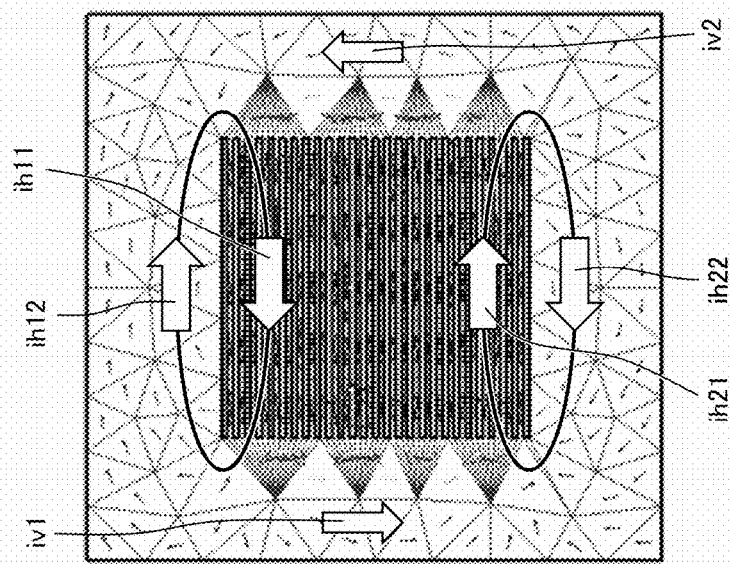
FIG. 3B and FIG. 3C are views illustrating a relationship between currents flowing through the linear strip pattern 10 and the vicinity thereof and currents flowing through a coil pattern of a planar coil antenna.
Figure 3B:
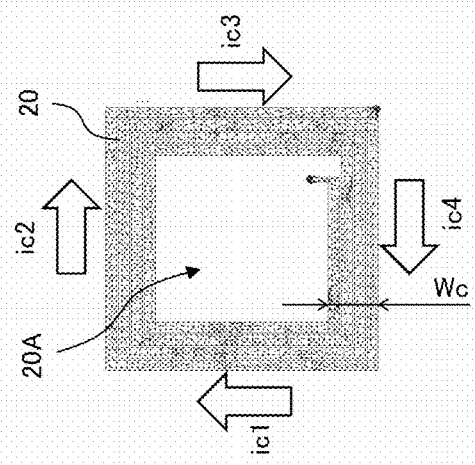
Figure 3A:
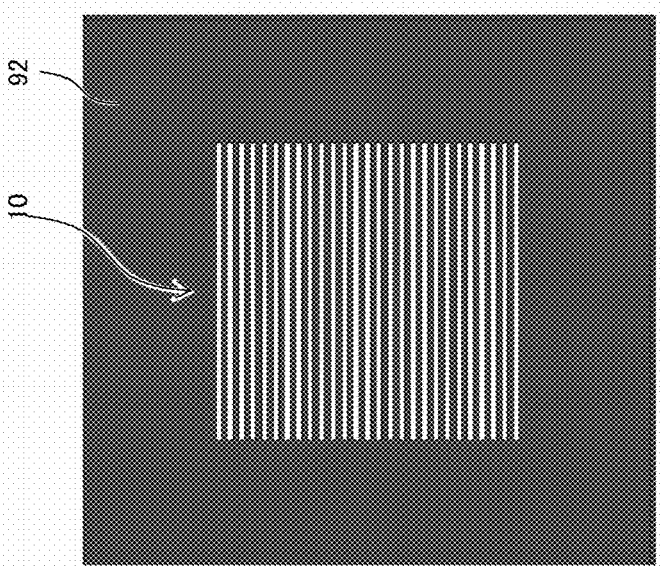
FIG. 3A is a view illustrating the structure of a linear strip pattern 10 in the antenna portion of the mobile communication terminal according to the first preferred embodiment of the present invention.

FIG. 3A is a view illustrating the structure of the linear strip pattern 10. FIGS. 3B and 3C are views illustrating a relationship between currents flowing through the linear strip pattern 10 and the vicinity thereof and currents flowing through the coil pattern of the planar coil antenna.

In FIG. 3B, arrows are examples of directions of currents $ic1$, $ic2$, $ic3$, and $ic4$ flowing through the coil pattern 20. In FIG. 3C, a current $ih11$ is a current that is induced by a magnetic field generated by the current $ic2$ flowing through the coil pattern 20 and a current $ih12$ is a current forming a loop together with the current $ih11$. In the same manner, a current $ih21$ is a current that is induced with a magnetic field generated by the current $ic4$ flowing through the coil pattern 20 and a current $ih22$ is a current forming a loop together with the current $ih21$. A current $iv1$ is a current that is induced with a magnetic field generated by the current $ic1$ flowing through the coil pattern 20, and a current $iv2$ is a current that is induced with a magnetic field generated by the current $ic3$ flowing through the coil pattern 20.

A winding width We of the coil pattern 20 of the planar coil antenna is larger than a total value of a line width for two linear strip portions 11 (see FIG. 2) and a line-to-line distance thereof.

As described above, the currents are induced in the extension direction of the linear strip portions whereas current paths are cut by the slits in the line width direction (direction perpendicular or substantially perpendicular to the extension direction of the linear strip portions) and the current hardly flows in the line width direction. The currents $ih12$ and $ih22$ flow through the lower metal housing 92 in the same directions as those of the currents $ic2$ and $ic4$ flowing through the coil pattern 20, respectively. Therefore, the currents flowing around along the inner edges of the opening 30 (see FIG. 2) of the lower metal housing 92 do not completely cancel the magnetic fields by the planar coil antenna with eddy currents. The magnetic fields by the planar coil antenna pass through the lower metal housing 92 in a penetrating manner and are coupled to an antenna of another communication party.

Figure 4A:
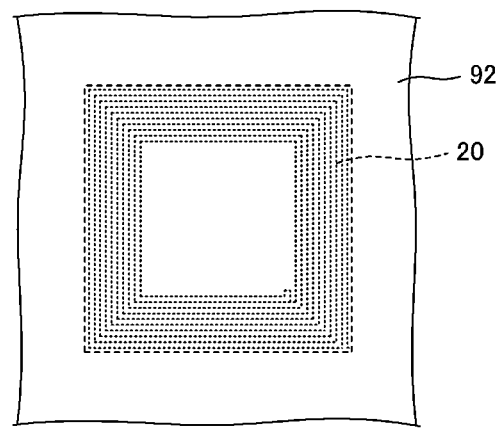
FIG. 4A and FIG. 4B are plan views of an antenna portion of a mobile communication terminal as comparison examples for comparison to the first preferred embodiment of the present invention.
Figure 4B:
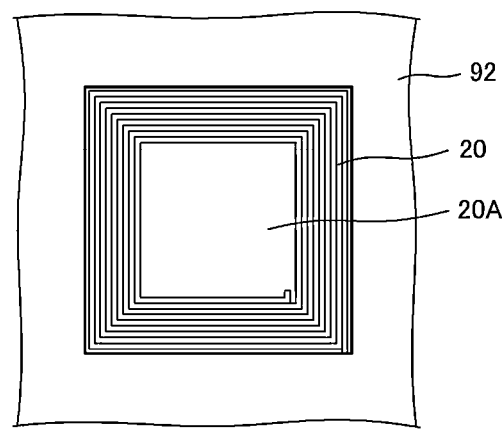

FIGS. 4A and 4B are plan views of an antenna portion of a mobile communication terminal as comparison examples for comparison to the first preferred embodiment of the present invention. FIG. 4A illustrates an example in which neither of an opening nor a slit is formed on the lower metal housing 92 and FIG. 4B illustrates an example in which an opening is formed on the lower metal housing 92 at a position at which the planar coil antenna opposes it. The configuration of the planar coil antenna in each of the examples is the same as that in FIG. 2.

Figure 5:
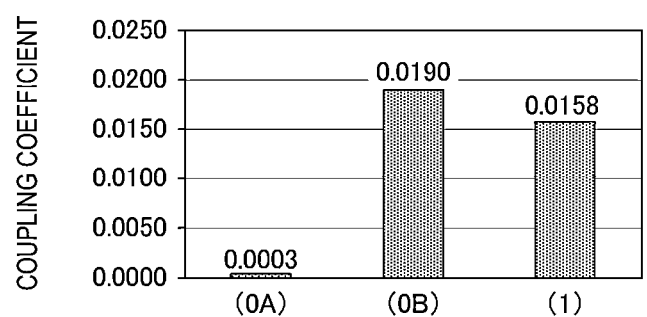
FIG. 5 is a graph illustrating characteristics of the antenna portion in the first preferred embodiment of the present invention as illustrated in FIG. 2 and characteristics of the antenna portions in the comparison examples as illustrated in FIG. 4A and FIG. 4B.

FIG. 5 is a graph illustrating the characteristics of the antenna portion in the first preferred embodiment as illustrated in FIG. 2 and the characteristics of the antenna portions in the comparison examples as illustrated in FIG. 4A and FIG. 4B. In FIG. 5, a longitudinal axis indicates a coupling coefficient to an antenna of a communication party. The antenna of another communication party is a loop antenna of φ70 mm for reader/writer. A distance between the antennas is 25 mm.

In FIG. 5, (0A) and (0B) indicate characteristics of the respective antenna portions as illustrated in FIGS. 4A and 4B and (1) indicates characteristics of the antenna portion in the first preferred embodiment as illustrated in FIG. 2. As illustrated in FIG. 4A, when neither of the opening nor the slit is formed on the lower metal housing 92, the coupling coefficient is as extremely low as 0.0003 and the antenna portion does not function as an antenna. As illustrated in FIG. 4B, when the opening is formed on the lower metal housing 92 at the position at which the planar coil antenna opposes it, the coupling coefficient is 0.019 and the antenna portion is strongly coupled to the antenna of another communication party. The coupling coefficient of the antenna portion in the first preferred embodiment as illustrated in FIG. 2 is 0.0158 and the antenna portion is sufficiently coupled to the antenna of another communication party.

According to the present preferred embodiment, a relatively large coupling coefficient is obtained although the slit total area of the opening 30 is approximately one half of the area of the opening as illustrated in FIG. 4B. Further, the substantial opening area of the opening 30 is small and lowering of the mechanical strength of the lower housing due to the opening 30 is therefore small. The slits each having the width of approximately 0.5 mm, for example, are provided on the metal housing only, so that the slits are not easy to be visually observed in a normal operation state and the design of the outer appearance thereof is not constrained. Moreover, a shield effect on the opening of the metal housing is able to be ensured.

Second Preferred Embodiment

A second preferred embodiment of the present invention describes an example in which a linear strip pattern is different from that in the first preferred embodiment of the present invention.

Figure 6:
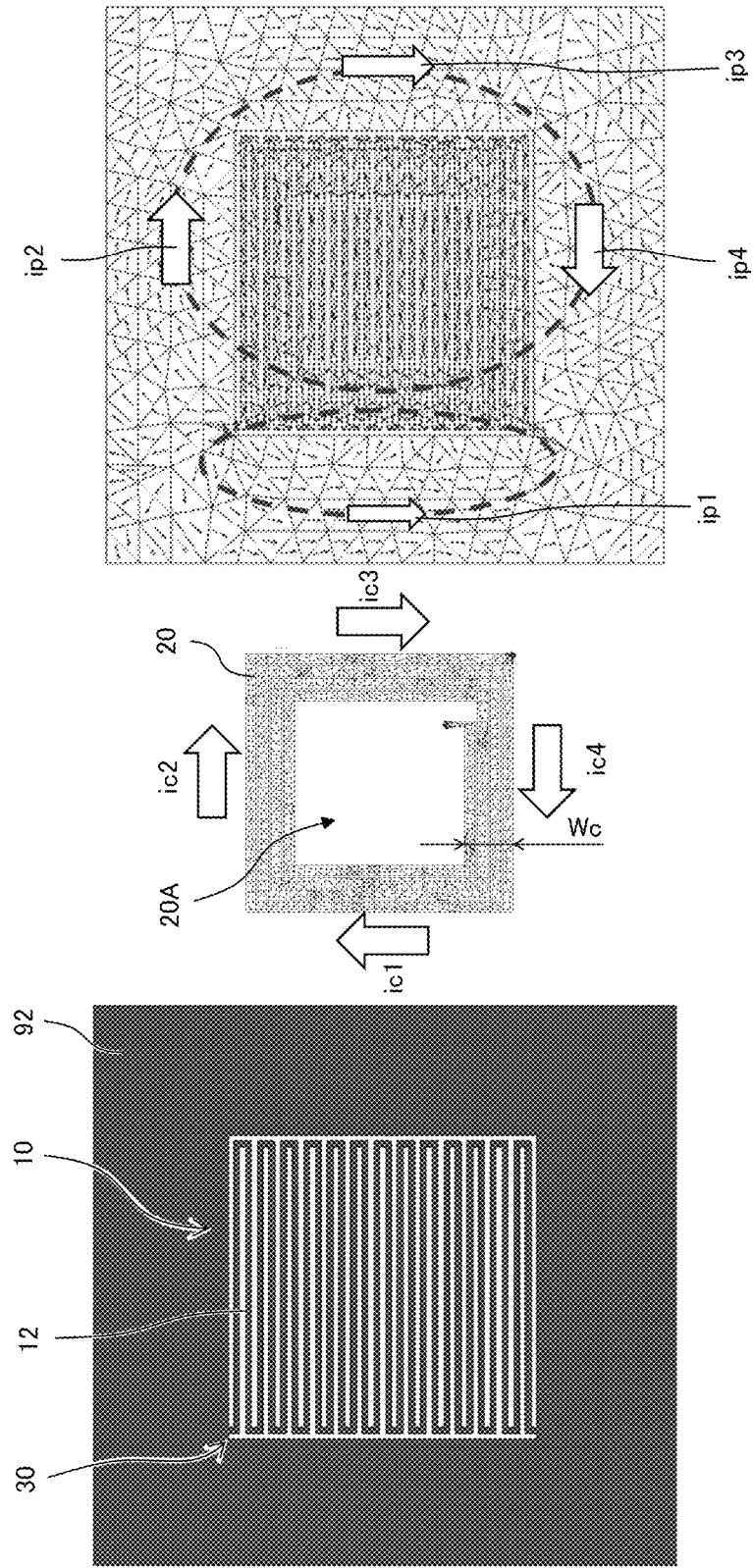
FIG. 6A is a view illustrating the structure of the linear strip pattern 10 in an antenna portion of a mobile communication terminal according to a second preferred embodiment.
FIG. 6B and FIG. 6C are views illustrating a relationship between currents flowing through the linear strip pattern 10 and the vicinity thereof and currents flowing through the coil pattern of the planar coil antenna.

FIG. 6A is a view illustrating the structure of the linear strip pattern 10. FIGS. 6B and 6C are views illustrating a relationship between currents flowing through the linear strip pattern 10 and the vicinity thereof and currents flowing through the coil pattern of the planar coil antenna.

In the present preferred embodiment, the meandrous linear strip pattern 10 including a plurality of linear strip portions is provided in the opening 30. The linear strip pattern 10 configures a portion of the lower metal housing 92. That is to say, both ends of the linear strip pattern 10 are connected to two sides of the opening 30, which oppose each other. Therefore, currents induced in the extension direction of the linear strip pattern 10 are returned back by folded portions of the linear strip pattern 10 and a magnetic field cancelling magnetic fields that are generated by the planar coil antenna is hardly generated. Further, there is few path of a current flowing in the line width direction of the meandrous linear strip portions (direction perpendicular or substantially perpendicular to the extension direction of the linear strip portions). Accordingly, a large induction current does not flow through the linear strip pattern 10.

FIG. 6B is a plan view of the planar coil antenna. The basic configuration of the planar coil antenna preferably is the same or substantially the same as that in the first preferred embodiment.

The winding width Wc of the coil pattern 20 of the planar coil antenna is larger than a total value of a line width for two linear strip portions of the linear strip pattern 10 and a line-to-line distance thereof.

In FIG. 6B, arrows are examples of directions of currents ic1, ic2, ic3, and ic4 flowing through the coil pattern 20. In FIG. 6C, currents ip1, ip2, ip3, and ip4 are currents forming loops together with currents that are induced on the linear strip pattern 10 with magnetic fields generated by the currents ic1, ic2, ic3, and ic4 flowing through the coil pattern 20, respectively. The currents are induced to the linear strip pattern 10 but no current flows in one direction. That is to say, the linear strip portions of the linear strip pattern 10 go back and forth once or more than once in the winding width of the coil pattern 20 of the planar coil antenna. Therefore, regions in which the directions of the currents flowing through the linear strip portions of the linear strip pattern 10 are opposite to each other are repeated alternately. With this, the magnetic fields that are generated by the currents flowing through the linear strip pattern 10 are offset and a magnetic field cancelling the magnetic fields that are generated by the planar coil antenna is hardly generated in the opening 30. Accordingly, the magnetic fields by the planar coil antenna pass through the opening 30 of the lower metal housing 92 in a penetrating manner and are coupled to the antenna of another communication party.

Figure 7:
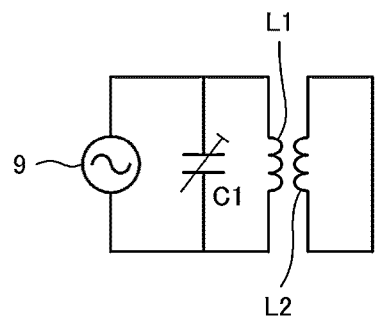
FIG. 7 is a circuit diagram of the antenna portion according to a second preferred embodiment of the present invention.
Figure 8A:
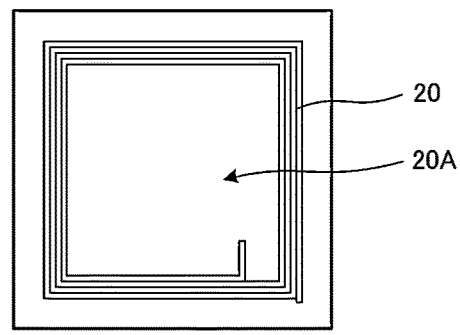
FIG. 8A and FIG. 8B are views illustrating examples of the antenna portion according to the second preferred embodiment of the present invention and are plan views of the planar coil antenna.
Figure 8B:
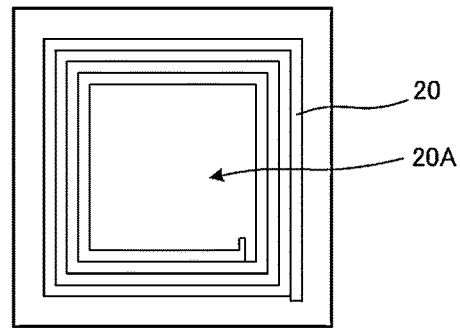

FIG. 7 is a circuit diagram of the antenna portion in the present preferred embodiment. In FIG. 7, an inductor L1 corresponds to inductance of the planar coil antenna and a capacitor C1 corresponds to combined capacitance of capacitance of the planar coil antenna and that of the capacitor connected for resonant frequency adjustment. A power supply circuit 9 is connected to an LC parallel circuit of the inductor L1 and the capacitor C1. Meanwhile in FIG. 7, an inductor L2 corresponds to inductance of the linear strip pattern 10. The coil pattern of the planar coil antenna and the linear strip pattern 10 are coupled to each other with a magnetic field and they are expressed as illustrated in FIG. 7 in an equivalent manner. Accordingly, the resonant frequency of the resonance circuit when seen from the power supply circuit 9 fluctuates when the linear strip pattern 10 is close to it. The capacitance of the capacitor C1 is adjusted such that the resonance circuit resonates at a predetermined frequency (for example, 13.56 MHz). Note that the meandrous pattern is configured to suppress lowering of the inductance when the planar coil antenna side is seen from the power supply circuit 9. Therefore, the number of turns of the coil pattern 20 is able to be reduced and the line width is also to be made larger. FIGS. 8A and 8B illustrate examples thereof and are plan views of the planar coil antenna.

In both examples of FIGS. 8A and 8B, the number of turns of the coil pattern 20 is 4, for example. FIG. 8A is an example in which the coil opening 20A is enlarged by reducing the number of turns of the coil pattern 20 and FIG. 8B is an example in which the coil opening 20A is not changed and the line width of the coil pattern 20 is made larger in accordance with the reduced necessary number of turns.

Figure 9:
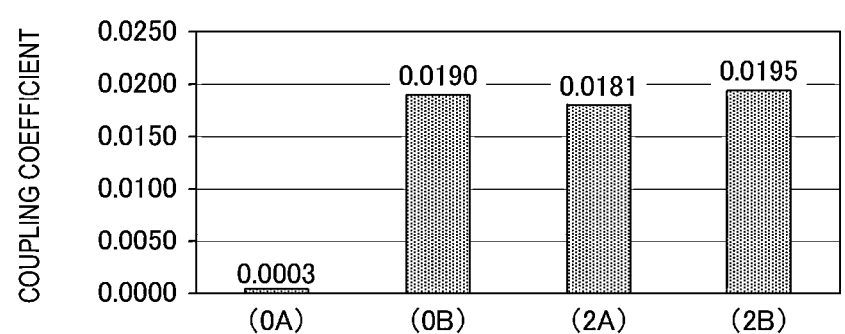
FIG. 9 is a graph illustrating characteristics of the antenna portions according to the second preferred embodiment of the present invention as illustrated in FIG. 8A and FIG. 8B and characteristics of the antenna portions in the comparison examples as illustrated in FIG. 4A and FIG. 4B.

FIG. 9 is a graph illustrating characteristics of the antenna portions according to the second preferred embodiment as illustrated in FIG. 8A and FIG. 8B and characteristics of the antenna portions in the comparison examples as illustrated in FIG. 4A and FIG. 4B. In FIG. 9, a longitudinal axis indicates a coupling coefficient to the antenna of another communication party. Measurement conditions are the same as those in the first preferred embodiment.

In FIG. 9, (0A) and (0B) indicate characteristics of the respective antenna portions as illustrated in FIGS. 4A and 4B and (2A) and (2B) indicate characteristics of the respective antenna portions according to the second preferred embodiment as illustrated in FIGS. 8A and 8B.

According to the present preferred embodiment, a high coupling coefficient equivalent to that in the comparison example (FIG. 4B) in which a simple opening is formed with no linear strip pattern can be obtained. In particular, the line width of the coil pattern is made larger, so that loss is reduced and a Q value of the planar coil antenna is improved.

Third Preferred Embodiment

Figure 10A:
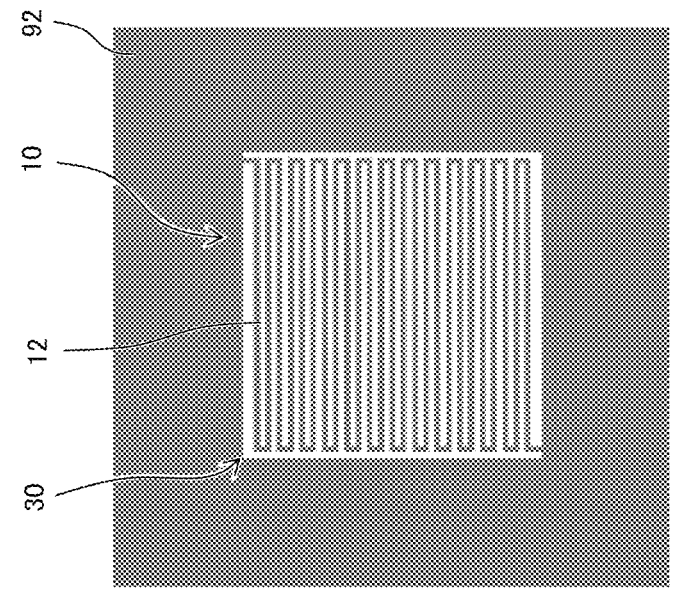
FIG. 10A is a view illustrating the structure of the linear strip pattern 10 in an antenna portion of a mobile communication terminal according to a third preferred embodiment of the present invention.
Figure 10B:
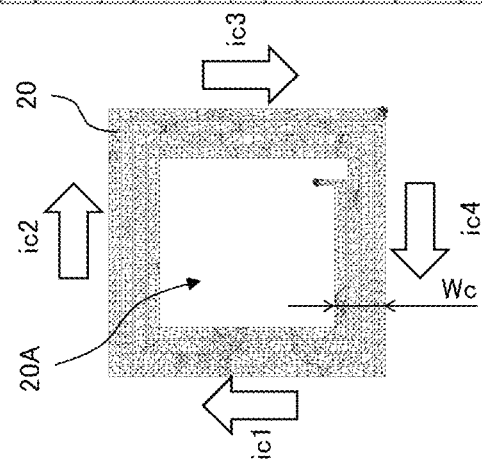
FIG. 10B and FIG. 10C are views illustrating a relationship between currents flowing through the linear strip pattern 10 and the vicinity thereof and currents flowing through the coil pattern of the planar coil antenna.
Figure 10C:
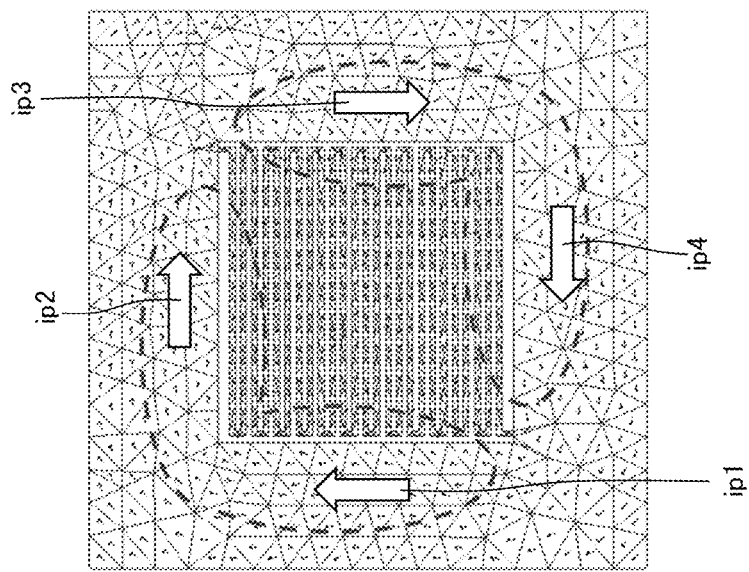

FIG. 10A is a view illustrating the structure of the linear strip pattern 10 in an antenna portion of a mobile communication terminal according to a third preferred embodiment of the present invention. FIGS. 10B and 10C are views illustrating a relationship between currents flowing through the linear strip pattern 10 and the vicinity thereof and currents flowing through the coil pattern of the planar coil antenna.

Although in the example as illustrated in FIG. 6A, both ends of the linear strip pattern 10 preferably are connected to the metal housing 92 at a position along one side of the opening 30 in the second preferred embodiment, both ends of the linear strip pattern 10 are connected to the metal housing 92 at positions close to diagonal corners of the opening 30 in the present preferred embodiment. With this configuration, connection positions of the linear strip pattern 10 to the metal housing 92 are symmetrical, so that an induction current interfering a current flowing through the coil pattern of the planar coil antenna is difficult to be generated on the linear strip pattern 10. Therefore, the coupling coefficient to the antenna of another communication party is increased. The coupling coefficient of the antenna portion in the present preferred embodiment preferably is about 0.02, for example, under the conditions same as those in the above-mentioned preferred embodiments.

Fourth Preferred Embodiment

A fourth preferred embodiment of the present invention describes an example in which a linear strip pattern is different from those in the first, second, and third preferred embodiments.

Figure 11C:
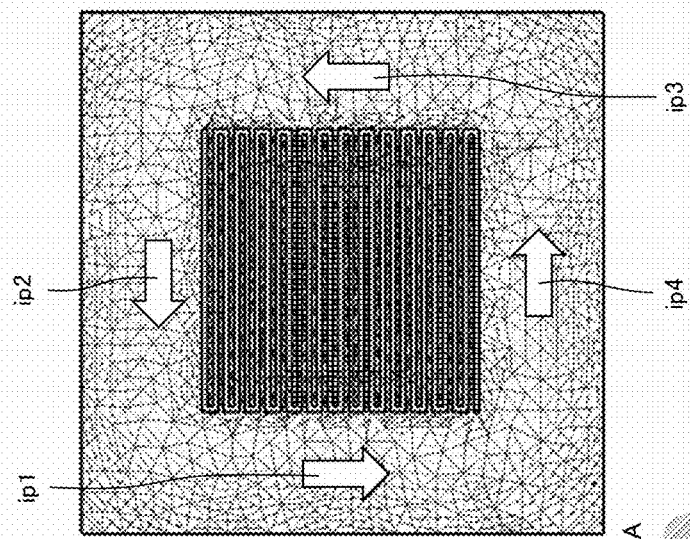
FIG. 11B and FIG. 11C are views illustrating a relationship between currents flowing through the linear strip pattern 10 and the vicinity thereof and currents flowing through the coil pattern of the planar coil antenna.
Figure 11B:
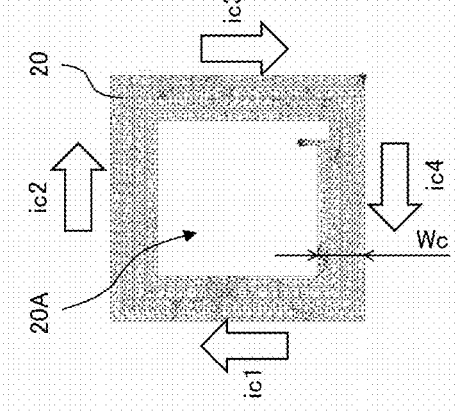
Figure 11D:
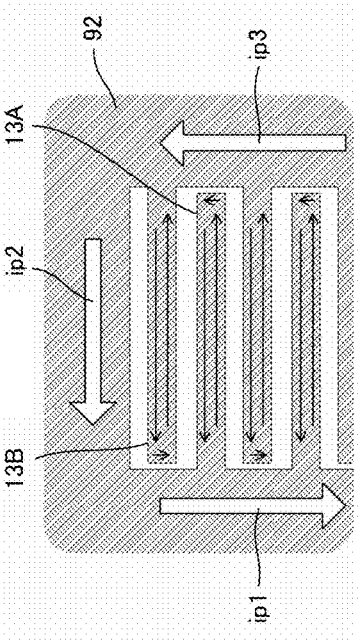
FIG. 11D is a partial enlarged view of FIG. 11C and is a view illustrating currents flowing through comb-shaped linear strip portions.
Figure 11A:
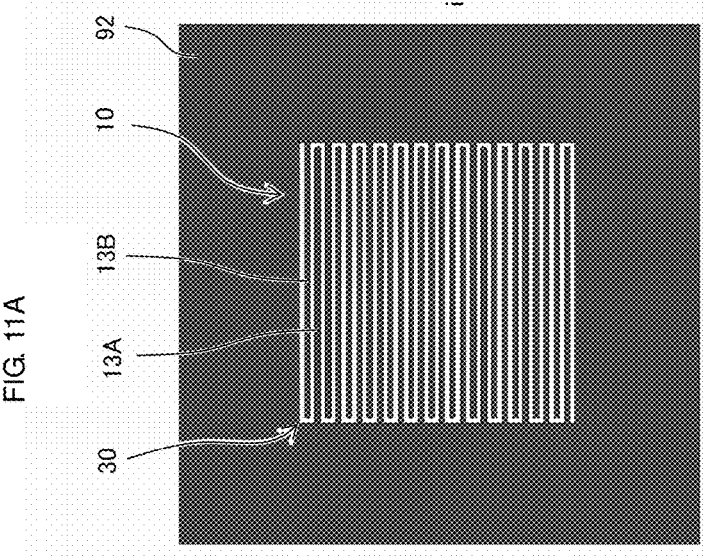
FIG. 11A is a view illustrating the structure of the linear strip pattern 10 in an antenna portion of a mobile communication terminal according to a fourth preferred embodiment.

FIG. 11A is a view illustrating the structure of the linear strip pattern 10. FIGS. 11B and 11C are views illustrating a relationship between currents flowing through the linear strip pattern 10 and the vicinity thereof and currents flowing through the coil pattern of the planar coil antenna. FIG. 11D is a partial enlarged view of FIG. 11C and is a view illustrating currents flowing through comb-shaped linear strip portions.

In the present preferred embodiment, the linear strip pattern 10 is configured by comb-shaped linear strip patterns 13A and 13B provided in the opening 30. Each of the comb-shaped linear strip patterns 13A and 13B includes a plurality of linear strip portions and portions connecting the plurality of linear strip portions. The comb-shaped linear strip patterns 13A and 13B are one non-limiting example of the linear strip pattern. Teeth of combs of the comb-shaped linear strip patterns 13A and 13B alternately oppose each other. The comb-shaped linear strip patterns 13A and 13B configure a portion of the lower metal housing 92. That is to say, ends of the individual teeth of the comb-shaped linear strip patterns 13A and 13B are connected to the inner circumference of the opening 30.

FIG. 11B is a plan view of the planar coil antenna. The configuration of the planar coil antenna preferably is the same or substantially the same as that in the second preferred embodiment.

Further, the winding width We of the coil pattern 20 of the planar coil antenna is larger than a total value of a line width for two linear strip portions of the comb-shaped linear strip portions 13A and 13B and a line-to-line distance thereof.

In FIG. 11B, arrows are examples of directions of currents $ic_1$, $ic_2$, $ic_3$, and $ic_4$ flowing through the coil pattern 20. In FIG. 11C, currents $ip_1$, $ip_2$, $ip_3$, and $ip_4$ are currents that are induced with magnetic fields generated by the currents $ic_1$, $ic_2$, $ic_3$, and $ic_4$ flowing through the coil pattern 20, respectively.

FIG. 11D is a view in which the comb-shaped linear strip patterns in FIG. 11C are enlarged in the line width direction of the linear strip portions. Currents are also induced to the comb-shaped linear strip patterns 13A and 13B and the currents flow back and forth along edge ends of the respective linear strip portions of the comb-shaped linear strip patterns 13A and 13B. With this, magnetic fields that are generated by the currents flowing through the linear strip portions are offset and magnetic fields by the planar coil antenna pass through the opening 30 of the lower metal housing in a penetrating manner and are coupled to the antenna of another communication party.

In particular, when the plurality of linear strip portions of the comb-shaped linear strip patterns 13A and 13B oppose each other in the winding width of the coil pattern 20 of the planar coil antenna, the currents induced by coupling of the comb-shaped linear strip patterns 13A and 13B to the coil pattern 20 are offset. Therefore, an induction current (eddy current) cancelling the signal current of the planar coil antenna is suppressed or prevented from flowing through the lower metal housing 92 effectively.

Figure 12:
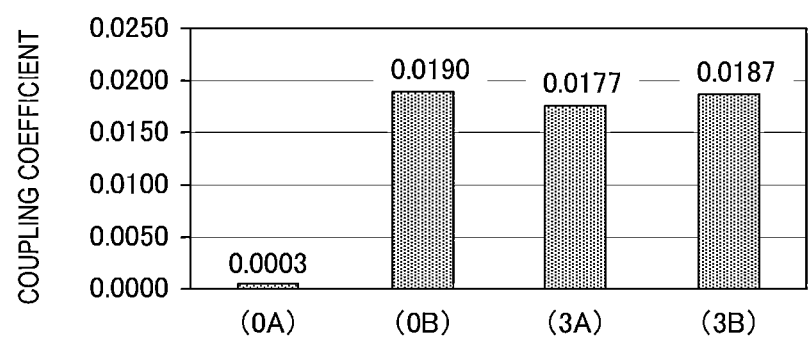
FIG. 12 is a graph illustrating characteristics of the antenna portion according to a fourth preferred embodiment of the present invention as illustrated in FIGS. 11A-11D and characteristics of the antenna portions in the comparison examples as illustrated in FIG. 4A and FIG. 4B.

FIG. 12 is a graph illustrating characteristics of the antenna portions according to the fourth preferred embodiment as illustrated in FIG. 11 and characteristics of the antenna portions in the comparison examples as illustrated in FIG. 4A and FIG. 4B. In FIG. 12, a longitudinal axis indicates a coupling coefficient to the antenna of another communication party. Measurement conditions are the same as those in the first preferred embodiment.

In FIG. 12, (0A) and (0B) indicate characteristics of the respective antenna portions as illustrated in FIGS. 4A and 4B, respectively, and (3A) and (3B) indicate characteristics of the antenna portions according to the fourth preferred embodiment as illustrated in FIG. 11. Note that (3A) corresponds to characteristics when the planar coil antenna as illustrated in FIG. 8A is used and (3B) corresponds to characteristics when the planar coil antenna as illustrated in FIG. 8B is used.

According to the present preferred embodiment, a high coupling coefficient equivalent to that in the comparison example (FIG. 4B) in which a simple opening is formed with no linear strip pattern can be obtained. In particular, the line width of the coil pattern is made larger, so that loss is reduced and a Q value of the planar coil antenna is improved.

Fifth Preferred Embodiment

A fifth preferred embodiment of the present invention describes an example in which longitudinal and lateral dimensions of the linear strip pattern 10 are changed. The linear strip pattern has a stripe shape that preferably is the same or substantially the same as that in the first preferred embodiment.

Figure 13A:
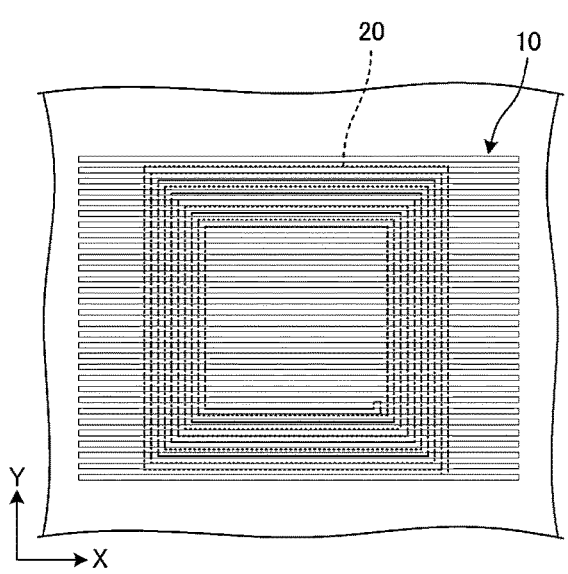
FIG. 13A, FIG. 13B, FIG. 13C, and FIG. 13D are views illustrating examples where longitudinal and lateral dimensions of the linear strip pattern 10 are changed in an antenna portion of a mobile communication terminal according to a fifth preferred embodiment of the present invention.

FIG. 13A illustrates an example in which a dimension of the linear strip portions in the extension direction in a dimension of the opening (X-axis direction) is larger than an outer dimension of the coil pattern 20 in the same direction. The dimension of the linear strip portions in the opening in the extension direction preferably is about 35 mm and the dimension thereof in the direction (Y-axis direction) perpendicular or substantially perpendicular to the extension direction preferably is about 26.35 mm, for example.

Figure 13B:
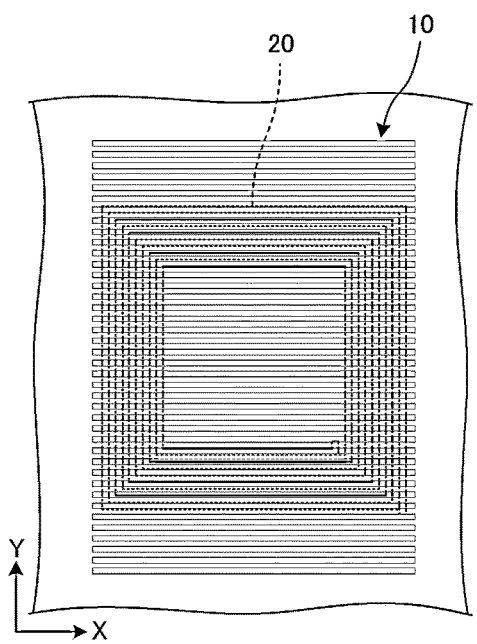

FIG. 13B illustrates an example in which a dimension of the linear strip portions in the dimension of the opening in the direction perpendicular or substantially perpendicular to the extension direction (X-axis direction) is larger than the outer dimension of the coil pattern 20 in the same direction. The dimension of the linear strip pattern in the opening in the extension direction preferably is about 27.1 mm and the dimension thereof in the direction (Y-axis direction) perpendicular or substantially perpendicular to the extension direction preferably is about 35.5 mm, for example.

Figure 13C:
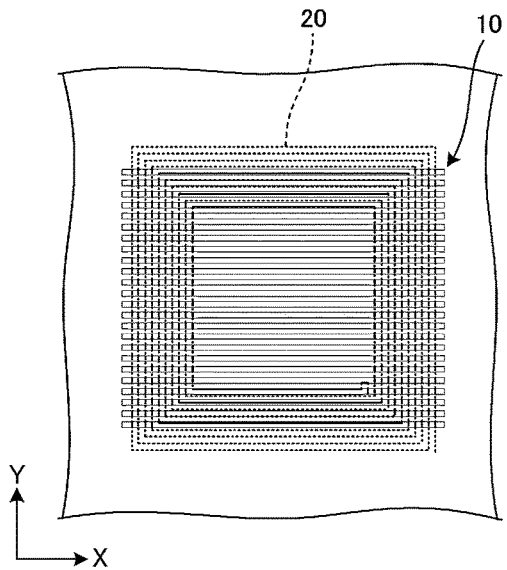
Figure 13D:
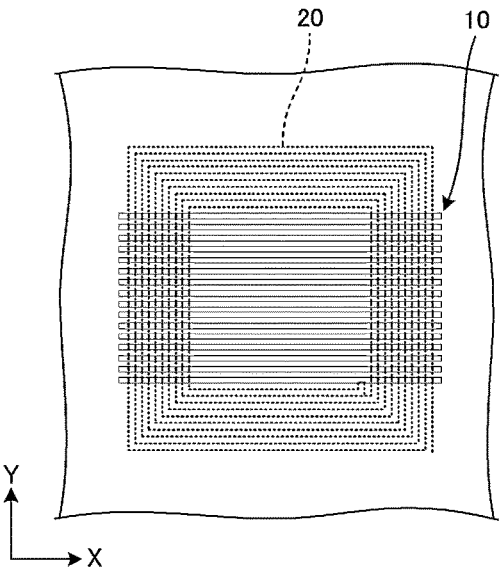

FIGS. 13C and 13D illustrate examples in which the dimension of the linear strip portions in the dimension of the opening in the direction perpendicular or substantially perpendicular to the extension direction (X-axis direction) is smaller than the outer dimension of the coil pattern 20 in the same direction. In FIG. 13C, the dimension of the linear strip portions in the opening in the extension direction preferably is about 27.1 mm and the dimension thereof in the direction (Y-axis direction) perpendicular or substantially perpendicular to the extension direction preferably is about 19.5 mm, for example. In FIG. 13D, the dimension of the linear strip portions in the opening in the extension direction preferably is about 27.1 mm and the dimension thereof in the direction perpendicular or substantially perpendicular to the extension direction preferably is about 12.5 mm, for example.

Figure 14:
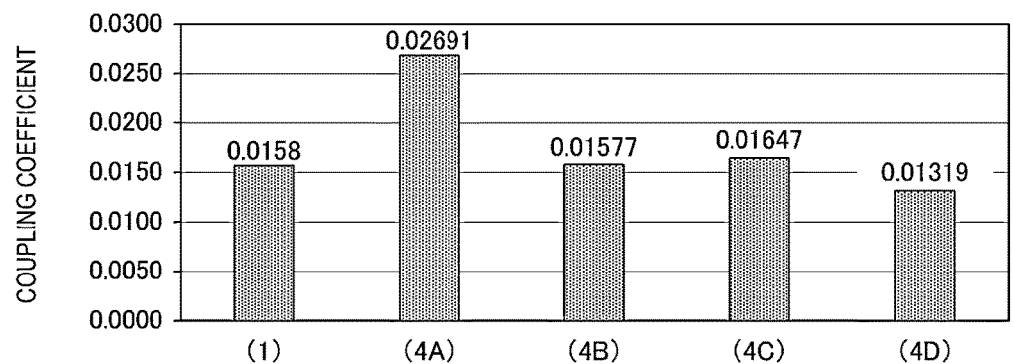
FIG. 14 is a graph illustrating characteristics of the antenna portions according to the fifth preferred embodiment of the present invention as illustrated in FIG. 13A to FIG. 13D and characteristics of the antenna portion according to the first preferred embodiment of the present invention as illustrated in FIG. 2.

FIG. 14 is a graph illustrating characteristics of the antenna portions according to the fifth preferred embodiment as illustrated in FIG. 13 and characteristics of the antenna portion according to the first preferred embodiment as illustrated in FIG. 2. In FIG. 14, a longitudinal axis indicates a coupling coefficient to the antenna of another communication party. Measurement conditions are the same as those in the first preferred embodiment.

In FIG. 14, (1) indicates the characteristics of the antenna portion as illustrated in FIG. 2, and (4A), (4B), (4C), and (4D) indicate the characteristics of the respective antenna portions in the fifth preferred embodiment as illustrated in FIGS. 13A, 13B, 13C, and 13D, respectively.

As illustrated in FIG. 13A, when the dimension of the linear strip portions in the extension direction in the dimension of the opening (X-axis direction) is larger than the outer dimension of the coil pattern 20 in the same direction, the induction current flowing around along the inner circumferential edges of the opening 30 is suppressed effectively so as to obtain a coupling coefficient as high as about 0.0269, for example. As illustrated in FIG. 13B, a large increase effect of the coupling coefficient is not obtained even when the opening is enlarged in the direction (Y-axis direction) perpendicular or substantially perpendicular to the extension direction of the linear strip portions.

As illustrated in FIG. 13C, the coupling coefficient is improved when the opening extends approximately one half of the winding width of the coil pattern 20. The coupling coefficient is higher than that with the characteristics of the antenna portion as described in the first preferred embodiment. This indicates that the lower metal housing 92 somewhat acts as a radiator. Alternatively, as illustrated in FIG. 13D, when the dimension of the linear strip portions in the dimension of the opening in the direction (Y-axis direction) perpendicular or substantially perpendicular to the extension direction is further made shorter, the coupling coefficient lowers again. This is because the current flowing in the same direction as that of the signal current flowing through the planar coil antenna in the metal housing is small.

Sixth Preferred Embodiment

Figure 15:
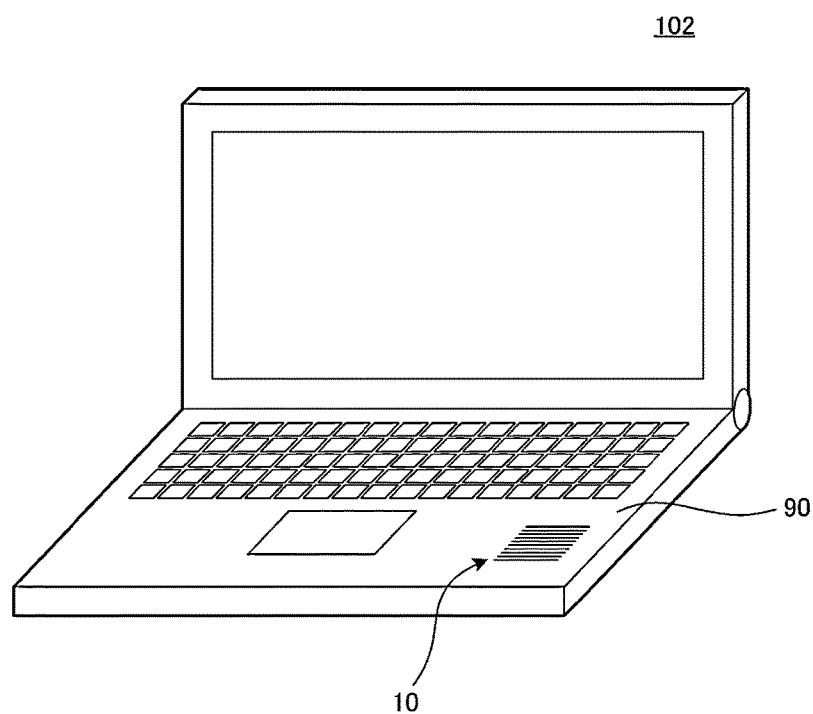
FIG. 15 is an outer appearance perspective view of a notebook personal computer as an example of a wireless communication device according to a sixth preferred embodiment of the present invention.

A sixth preferred embodiment of the present invention describes another example of a wireless communication device. FIG. 15 is an outer appearance perspective view of a notebook personal computer as an example of the wireless communication device according to a sixth preferred embodiment. A notebook personal computer 102 includes a metal housing 90 and an opening and the linear strip pattern 10 are provided on an operation surface in a space next to a touch pad. A coil pattern of a planar coil antenna is arranged so as to oppose the linear strip pattern 10 in the same manner as that in the above-mentioned preferred embodiments.

In this manner, a portion of the operation surface of the notebook personal computer is able to be used as a transmission/reception portion for NFC.

Other Preferred Embodiments

Although the linear strip pattern preferably is provided on the metal housing of the wireless communication device in the respective preferred embodiments as described above, an insulating seal designed to hide the linear strip pattern may be attached to the linear strip pattern.

Although the linear strip pattern preferably is provided on the metal housing as a main body structural member on an outer portion of the device in the respective preferred embodiments as described above, the present invention is not limited thereto. For example, when a metal chassis as a main body structural member is provided in a resin housing, the linear strip pattern may be provided on the metal chassis. Further, when a circuit substrate is accommodated in the resin housing, for example, the linear strip pattern may be applied to a ground pattern extending in a planar manner, which is formed on the circuit substrate. That is to say, the linear strip pattern may be provided on a portion of the ground pattern of the circuit substrate and the planar coil antenna may be arranged so as to oppose the linear strip pattern.

Although the linear strip pattern having a line and space (L/S) of about 0.5/0.5 mm is preferably provided in the respective preferred embodiments as described above, it is sufficient that the line width of the "linear strip pattern" is equal to or smaller than about ⅕ of the outer width of the coil pattern 20 in a preferred embodiment of the present invention.

Although the coverage of the opening by the linear strip pattern preferably is about 50% in the respective preferred embodiments as described above, the coverage may be lower than about 50%. Note that the coverage of the opening by the linear strip pattern is preferably equal to or higher than about 30% from a viewpoint of an electrostatic shield effect.

Although the shape of the linear strip pattern preferably is a 180°-rotational symmetric shape or a shape approximating thereto in the respective preferred embodiments as described above, the shape may be asymmetrical. For example, the linear strip pattern may be a comb-shaped pattern projecting in only one direction from one side of the opening, for example.

Although the linear strip pattern of the linear strip pattern 10 preferably is integrated with the planar conductor such as the metal housing in the respective preferred embodiments as described above, the linear strip pattern 10 may be a separate member and may be bonded to an opening of the planar conductor of the metal housing or the like.

When the antenna portion by the linear strip pattern and the planar coil antenna in the respective preferred embodiments as described above is applied to the RFID antenna, for example, it can be also used as an antenna for an RFID tag. Further, it can be also used as an antenna for a reader/writer.

Although the linear strip pattern including the plurality of linear strip portions parallel or substantially parallel with one another preferably is provided in the respective preferred embodiments as described above, the plurality of linear strip portions may not be accurately parallel or substantially parallel with one another. An expression "parallel or substantially parallel" also includes a case where the plurality of linear strip portions are "substantially parallel or substantially parallel" with one another in a range of substantially providing an action effect as described above.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A wireless communication device comprising:
   a planar conductor including an opening;
   a housing including the planar conductor;
   a planar coil antenna opposed to the opening and including a coil pattern and a coil opening; and
   a linear strip pattern including a plurality of linear strip portions parallel or substantially parallel with one another; wherein
   a portion of the linear strip pattern which is connected to the planar conductor around the opening is provided in the opening;
   the opening of the planar conductor is not connected to any peripheral edge of the planar conductor; and
   the planar coil antenna is incorporated in the housing.

2. The wireless communication device according to claim 1, wherein a dimension of the linear strip portions in a dimension of the opening in an extension direction is larger than an outer dimension of the coil pattern in a same direction when seen from above.

3. The wireless communication device according to claim 1, wherein when seen from above, a dimension of the linear strip portions in a dimension of the opening in an extension direction is larger than a dimension of the linear strip portions in a direction perpendicular or substantially perpendicular to the extension direction and a dimension of the opening is larger than a dimension of the coil opening in the direction perpendicular or substantially perpendicular to the extension direction of the linear strip portions.

4. The wireless communication device according to claim 1, wherein the opening has a rectangular or substantially rectangular shape when seen from above and the linear strip pattern is connected to two opposing sides of the opening.

5. The wireless communication device according to claim 1, wherein a coverage of the opening by the linear strip pattern is equal to or higher than about 30%.

6. The wireless communication device according to claim 1, wherein an inductance value of the planar coil antenna is defined such that a resonant frequency of the planar coil antenna is a predetermined value in accordance with inductance of the linear strip pattern coupled to the planar coil antenna.

7. The wireless communication device according to claim 1, wherein a winding width of the coil pattern of the planar coil antenna is larger than a total value of a line width for two linear strip portions and a line-to-line distance of the linear strip portions.

8. The wireless communication device according to claim 1, wherein both ends of the respective linear strip portions are connected to an inner circumference of the opening.

9. The wireless communication device according to claim 1, wherein slits are provided between adjacent ones of the plurality of linear strip portions.

10. The wireless communication device according to claim 1, wherein a magnetic layer is provided on the coil opening and the coil pattern.

11. The wireless communication device according to claim 1, further comprising a capacitor of a power supply circuit connected to the coil pattern.

12. The wireless communication device according to claim 1, wherein the linear strip pattern has one of a stripe shape and a meandering shape.

13. The wireless communication device according to claim 1, wherein the linear strip pattern includes a plurality of comb-shaped linear strip patterns provided in the opening.

14. The wireless communication device according to claim 13, wherein the housing is a metal housing, and the plurality of comb-shaped linear strip patterns define a portion of the metal housing.

15. The wireless communication device according to claim 1, wherein the housing is a metal housing of a wireless communication apparatus, and the linear strip pattern is provided on the metal housing.

16. A mobile communication terminal comprising the wireless communication device according to claim 1.

17. The mobile communication terminal according to claim 16, wherein the housing is a metal housing of the mobile communication terminal, and both ends of the linear strip pattern are connected to the metal housing.

18. The mobile communication terminal according to claim 17, wherein the both ends of the linear strip pattern are connected to the metal housing at one of a position alone one side of the opening, and at positions at or near diagonal corners of the opening.

19. A wireless communication apparatus comprising the wireless communication device according to claim 1.

20. The wireless communication apparatus according to claim 19, wherein the wireless communication apparatus is a computer.

21. The wireless communication device according to claim 1, wherein in a plan view, the planar coil antenna overlaps with the opening of the planar conductor.

* * * * *